US007002511B1

(12) United States Patent
Ammar et al.

(10) Patent No.: US 7,002,511 B1
(45) Date of Patent: Feb. 21, 2006

(54) MILLIMETER WAVE PULSED RADAR SYSTEM

(75) Inventors: Danny F. Ammar, Windermere, FL (US); David M. Bills, Orlando, FL (US); Gavin Clark, Tavares, FL (US); Matt H. Shafie, Casselberry, FL (US)

(73) Assignee: Xytrans, Inc., Orlando, FL (US)

( * ) Notice: Subject to any disclaimer, the term of this patent is extended or adjusted under 35 U.S.C. 154(b) by 0 days.

(21) Appl. No.: 11/070,483

(22) Filed: Mar. 2, 2005

(51) Int. Cl.
*G01S 7/28* (2006.01)
*G01S 13/10* (2006.01)
*G01S 7/40* (2006.01)

(52) U.S. Cl. .................. 342/134; 342/82; 342/89; 342/118; 342/128; 342/130; 342/131; 342/132; 342/165; 342/173; 342/174; 342/175; 342/194; 342/195; 342/196

(58) Field of Classification Search .................. 342/27, 342/28, 73–75, 80, 82–103, 118, 128–144, 342/147, 149–154, 165–175, 192–197, 200–205, 342/25 R–25 F
See application file for complete search history.

(56) References Cited

U.S. PATENT DOCUMENTS

| | | | | |
|---|---|---|---|---|
| 4,218,678 A | * | 8/1980 | Fowler et al. | 342/194 |
| 4,504,833 A | * | 3/1985 | Fowler et al. | 342/194 |
| 4,724,418 A | * | 2/1988 | Weindling | 342/25 A |
| 5,146,616 A | * | 9/1992 | Tang et al. | 342/202 |
| 5,239,309 A | * | 8/1993 | Tang et al. | 342/201 |
| 5,708,436 A | | 1/1998 | Loiz et al. | |
| 5,726,657 A | * | 3/1998 | Pergande et al. | 342/202 |
| 6,067,040 A | * | 5/2000 | Puglia | 342/134 |
| 6,085,151 A | | 7/2000 | Farmer et al. | 701/301 |
| 6,114,987 A | | 9/2000 | Bjornholt | 342/200 |
| 6,639,543 B1 | * | 10/2003 | Puglia | 342/134 |
| 6,693,580 B1 | | 2/2004 | Wehling | 342/45 |

OTHER PUBLICATIONS

W.F. Graves, Jr., "Synthesizer and PLL Applications in Modern RF Systems"; TRAK Microwave Corp.; Tampa, Florida; Feb. 6, 2003.*
D. McWatters et al., "Design and Performance of a Miniature Radar L-Band Transceiver"; IPN Progress Report 42-158; Aug. 15, 2004; no place of publication listed.*

* cited by examiner

*Primary Examiner*—Bernarr E. Gregory
(74) *Attorney, Agent, or Firm*—Allen, Dyer, Doppelt, Milbrath & Gilchrist, P.A.

(57) ABSTRACT

A millimeter wave pulsed radar system includes a radar synthesizer having a voltage controlled oscillator/phase locked loop (VCO/PLL) circuit, direct digital synthesizer (DDS) circuit and quadrature modulator circuit that are operative to generate an intermediate frequency local oscillator signal (IF/LO signal). A radar transceiver is operative with the radar synthesizer for receiving the IF/LO signal. A transmitter section has a frequency multiplier that multiplies the IF/LO signal up to a millimeter wave (MMW) radar signal and a receiver section and includes a direct conversion mixer that receives a MMW radar signal and the IF/LO signal to produce I/Q baseband signals that are later digitized and processed.

30 Claims, 11 Drawing Sheets

US 7,002,511 B1

MILLIMETER WAVE PULSED RADAR SYSTEM

FIELD OF THE INVENTION

The present invention relates to radar systems, and more particularly, the present invention relates to millimeter wave (MMW) pulsed radar systems.

BACKGROUND OF THE INVENTION

Pulsed radar systems are different from continuous wave (CW) radars. CW radar systems typically include a transmitter that transmits a continuous flow of radio energy to the target, which re-radiates or scatters this energy and returns a small amount to a receiving antenna. A pulsed radar system, however, transmits a repetitive pattern of short pulses. Typically, a pulsed radar system includes a transmitter, for example, a master-oscillator power amplifier (MOPA) transmitter, and a chain of amplifiers that convert and increase the power level from a supplied electrical power to a transmitted signal power, each controlled by a modulator forming the radar pulse. It is possible in more simple radar systems to use a single high power oscillator with no further amplification. In some high performance radars, transmit-receive (T/R) modules include a final amplifier stage. In most designs, a duplexer is operative with the antenna and permits use of the antenna in both the transmit and receive direction. In some pulsed radar systems, a directional or mechanical antenna beam is rotated around the region to be searched. Usually, several pulses are generated per beam position as the mechanical antenna scans. A phased array radar system, on the other hand, may have various "dwells" and use only one transmission per beam position.

In these pulsed radar systems, several pulses can build-up an echo, which is received for non-coherent or video integration. Sensitivity can be improved by using low noise RF preamplifiers and mixing the signal with a local oscillator (LO) signal to produce an IF signal. After extensive digital signal processing within the IF circuitry, a detector can output a video signal on a cathode-ray tube (CRT) or other display.

Although some pulsed radar systems are now manufactured from standard components, and the overall prices for these systems have been dramatically reduced, prior art millimeter wave (MMW) pulsed radar systems, however, have been difficult to design and manufacture at low costs. This difficulty arises because of the difficulty in establishing and/or controlling transmit and receive intermediate frequency (IF) frequencies using synthesizers. Other technical drawbacks encountered with prior art MMW pulsed radio systems include the use of a poor synthesizer design and an inadequate pulse compression. Also, some MMW pulsed radar systems had a poor signal conversion from the MMW signal range to baseband. Other units had poor packaging and radar power efficiency.

SUMMARY OF THE INVENTION

It is therefore an object of the present invention to provide a millimeter wave (MMW) pulsed radar system that includes a simplified frequency synthesizer design and has increased efficiency when converting from millimeter wave to baseband.

It is yet another object of the present invention to provide an improved carrier suppression and a mixer that aids in improving radar power efficiency in a MMW pulsed radar system.

The millimeter wave radar system of the present invention includes a radio or frequency synthesizer that uses in one non-limiting example an integrated voltage controlled oscillator and phase locked loop (VCO/PLL) chip. Waveforms are generated using a Direct Digital Synthesis (DDS) circuit. Direct down conversion occurs from the millimeter wave to baseband using image reject mixers. The millimeter wave radar system of the present invention improves performance through digital calibration, while adaptively setting the power efficiency based on the environment. It uses high efficiency DC power conversion circuits and low cost packaging techniques. It is especially useful for high frequency, coherent, pulsed radar systems as used in imaging, target detection and weapon guidance and control, as non-limiting examples.

In accordance with one aspect of the present invention, the millimeter wave pulsed radar system of the present invention includes a radar synthesizer that includes a voltage controlled oscillator/phase locked loop (VCO/PLL) circuit that outputs a fixed frequency signal. A direct digital synthesizer (DDS) circuit generates in-phase and quadrature signals (I/Q signals). A quadrature modulator circuit receives the fixed frequency signal and I/Q signals to form a signal operative as a transmitter intermediate frequency signal and a receiver local oscillator signal (IF/LO signal). A radar transceiver is operative with the radar synthesizer and receives the IF/LO signal. The radar transceiver includes a transmitter section having a frequency multiplier that multiplies the IF/LO signal up to a millimeter wave (MMW) radar signal. A receiver section receives a MMW radar signal and includes a direct conversion mixer that receives the MMW radar signal and the IF/LO signal to produce I/Q baseband signals that are later digitized and processed.

In one aspect of the present invention, the VCO/PLL circuit and DDS circuit are phase locked to a single reference clock. The radar synthesizer can include a frequency multiplier that receives the IF/LO signal and multiplies the IF/LO signal up to about 8 to about 15 GHz. Radar pulse signals can be transmitted and received at the transceiver within the Ka-band. An analog-to-digital (A/D) converter can receive the I/Q baseband signals to produce digitized I/Q data, which is processed to provide image rejection. In one aspect of the invention, the processor can be operative for implementing a digital correction by injecting a signal at an amplifier input and measuring I/Q gain and phase balance to produce a correction term that is updated over temperature. The transmitter section could include a driver amplifier and high power amplifier that are operative during transmitter operation and inoperative during receiver operation.

In yet another aspect of the present invention, the high power amplifier could include a gate driver and two-state analog switch circuits operative for pulsing the high power amplifier and producing a pulsed MMW radar signal. A power divider can be operative with the transmitter and receiver sections and receive the IF/LO signal, and divide the IF/LO signal to the respective transmitter and receiver sections. The radar transceiver can include sum and difference antenna ports, and a transmit/receive switch and a sum/difference circuit operative with the transmitter and receiver section. A current boost circuit can generate DC power to the radar transceiver and be formed as an array of series connected capacitors, resistors and inductors. The direct conversion mixer preferably comprises a sub-harmonic image reject mixer.

In yet another aspect of the present invention, a circuit card assembly has microwave monolithic integrated circuit (MMIC) chips and circuit components mounted thereon that form the radar synthesizer and radar transceiver. The circuit card assembly can be positioned on a base that includes waveguide ports and a thermal path formed and positioned below any MMIC chips and circuit components that produce excess heat during operation. A substrate cover is secured on the circuit card assembly and includes metallization and RF channelization. The substrate cover and circuit card assembly could both be formed from FR4 material. The circuit card assembly can include a top layer formed as an RF specific material, such as Rogers material. A ground plane and heat spreader are preferably mounted under the MMIC chips and vias interconnect the base and ground plane and heat spreader.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
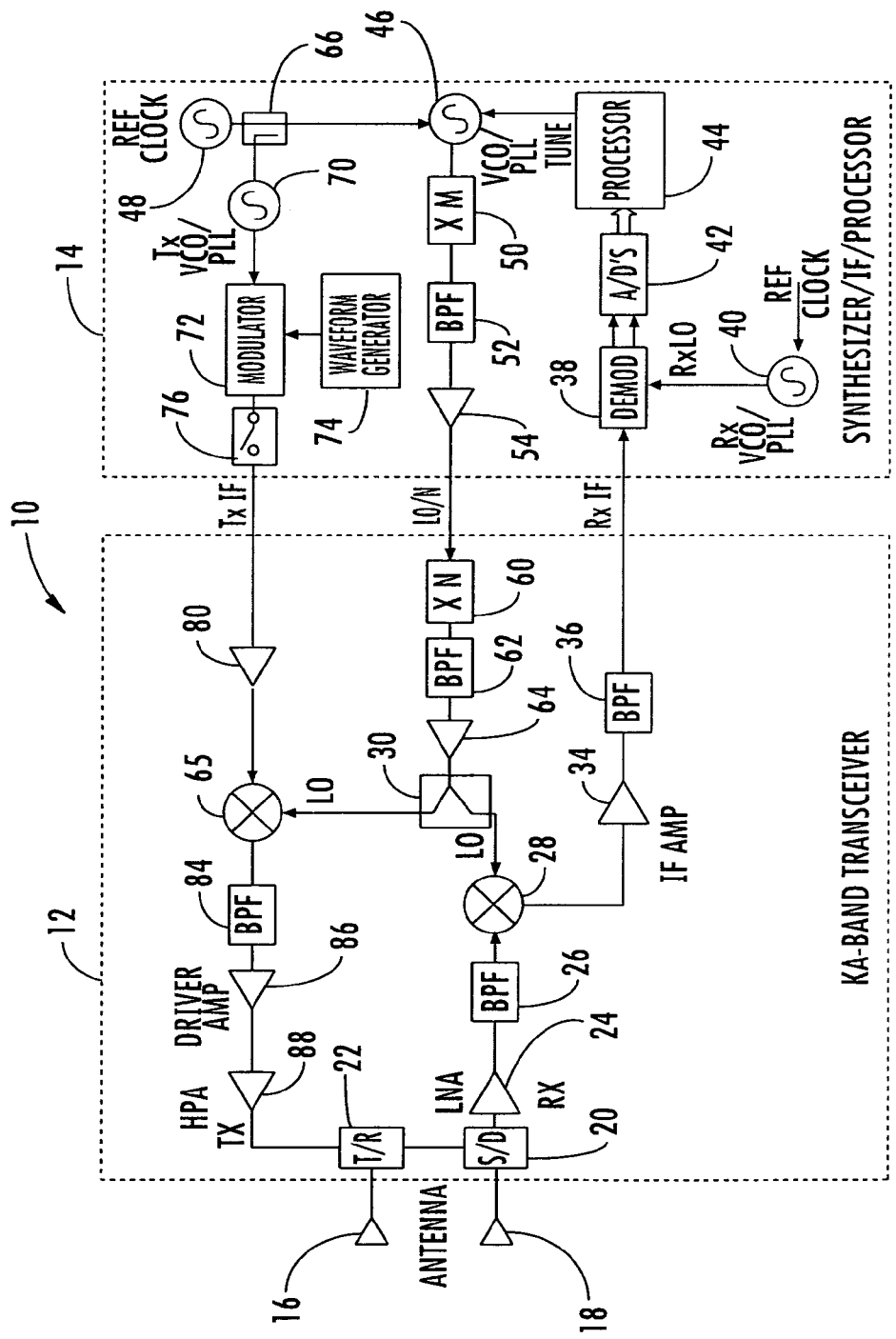
FIG. 1 is a block circuit diagram showing a prior art Ka-band, coherent, pulsed radar system.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Traditionally, pulsed millimeter wave (MMW) radar systems have been difficult to design and build in an efficient manner at a low cost. The MMW pulsed radar system of the present invention overcomes the disadvantages of prior art MMW pulsed radar systems by using improved frequency generation circuits, integrated Voltage Controlled Oscillator and Phase Locked Loop (VCO/PLL) chips, waveform generation with Direct Digital Synthesis (DDS) circuits, and direct down conversion of signals from MMW to baseband using image reject mixers. The pulsed MMW radar system of the present invention also has improved performance through digital calibration and adaptively sets its power efficiency based on the environment. It also incorporates a high efficiency DC power converter circuit and is implemented in an efficient and low cost package.

The MMW pulsed radar system of the present invention is particularly suited for high frequency, coherent, pulsed radar systems that are used in different applications, including imaging, target detection, and weapon guidance and control. This radar system of the present invention has an overall amplified system hardware as compared to functionally similar prior art circuits. It also has reduced cost and complexity. In the present invention, a frequency synthesizer circuit has a Direct Digital Synthesis (DDS) chip resulting in lower cost and higher performance than conventional radar synthesizers. The radar system supports various pulse compression techniques, for example, phase modulation and chirped frequency modulation (FM). The receiver directly down converts signals from millimeter wave (MMW) to baseband, resulting in lower cost and less complexity. Digital corrections improve any modulator/demodulator carrier suppression and image reject capability.

In one non-limiting example of the present invention, radar power efficiency is improved by automatically adjusting a high power amplifier's gate bias to increase thermal management. New, low cost packaging techniques in the present invention use a single board layout. Also, a laminate cover, for example, FR4 epoxy laminate, as one non-limiting example, seals the radio frequency (RF) area, resulting in a lower cost and weight. Greater efficiency occurs in the power supply by using a distributed circuit design. An improved radar transmit/receive switcher design has a ping-pong digital-to-analog conversion (DAC) output.

FIG. 1 is a block diagram of an example of a prior art MMW coherent pulsed radar system indicated generally at 10. As illustrated, this example of a prior art millimeter wave coherent pulse radar system includes a Ka-Band transceiver and a separate synthesizer/IF/processor indicated by the respective dashed lines at 12 and 14.

An antenna section includes a sum antenna port 16 and difference antenna port 18 as illustrated. The difference antenna port 18 connects to a respective sum/difference switch 20, and the sum antenna port 16 connects to a transmit/receive switch 22 within the Ka-band transceiver 12. The signal from the difference antenna port 18 and the sum/differential switch 20 is received in a low noise amplifier (LNA) 24 as part of a receiver section. The signal is next received in a bandpass filter 26 and mixer 28, which receives a signal from a local oscillator circuit via a power divider 30 operative therewith. The signal from the mixer 28 is passed through an IF amplifier 34 into a bandpass filter 36 and into a demodulator 38 of the synthesizer/IF/processor 14.

The demodulator 38 receives a receiver local oscillator signal (RxLO) generated from a voltage controlled oscillator/phased lock loop and oscillator circuit 40 (VCO/PLL) based on a reference clock signal. The signal from the demodulator 38 is passed into an analog/digital converter circuit 42 and into a processor 44, which could be a microprocessor, microcontroller or other processor functional for the present invention. It outputs a tuned signal, which is received into another voltage controlled oscillator/phase locked loop (VCO/PLL) and oscillator circuit 46. This circuit 46, in turn, has received a signal from an oscillator circuit 48 that provides a reference clock. The signal from the VCO/PLL and oscillator circuit 46 is passed into a frequency multiplier 50, bandpass filter 52, and amplifier 54. This local oscillator signal (LO/N) exits the synthesizer/IF/processor section 14 and enters the Ka-band transceiver section 12 at a frequency multiplier 60, bandpass filter 62, and amplifier 64. It is divided by the Wilkinson power divider 30 and a portion passes into the mixer 28 and another portion passes into a mixer 65 of the transmitter section.

Referring again to the synthesizer/IF/processor 14, the clock signal from reference clock 48 is split in splitter circuit 66 into a transmit voltage controlled oscillator/phase locked loop (VCO/PLL) and oscillator circuit 70 and passed into a modulator 72, which receives a signal from a waveform generator 74 to form the transmit intermediate frequency signal (TxIF). A gating circuit 76 passes the (TxIF)) signal from the synthesizer/IF/processor section 14 into the Ka-band transceiver section 12. The signal enters an amplifier 80. The amplified signal enters the mixer 65, which also receives the local oscillator signal via the Wilkinson power divider 30. From the mixer 65, the signal passes to a bandpass filter 84, into a driver amplifier 86 and high power amplifier (HPA) 88. A transmit signal is switched via the transmit/receive switch 22 and sum/difference switch and operative with the sum antenna port 16 and difference antenna port 18.

In operation, the MMW transceiver 10 transmits and receives signals through the transmit/receive switch 22, which is operatively connected to the sum antenna port 16 and sum/difference switch 20. The transmitter section in the transceiver 12 includes the IF amplifier circuit 80, which amplifies an L-band IF signal (about 1 to 2 GHz) coming from the Synthesizer section 14. A mixer circuit 65 is operative as an up-converter with the driver amplifier 86 and a final stage high power amplifier (HPA) 88. The receiver section is connected to the sum and difference antenna ports 16, 18 through the sum/difference switch 20, and includes the low noise amplifier (LNA) 24, the image reject band pass filter (BPF) 26, the mixer down converter circuit 28 and an IF amplifier 34. To reduce receiver complexity, the sum and difference channels are time multiplexed. The receiver IF frequency is typically about 1 to 2 GHz.

A local Oscillator (LO) section of the transceiver 12 uses the frequency multiplier 60, the harmonics reject bandpass filter (BPF) 62, and the local oscillator (LO) amplifier 64. The local oscillator signal is usually divided equally between the transmitter section and the receiver section using the Wilkinson power divider 30. The LO/N frequency coming from the synthesizer 14 is usually about 8 to 15 GHz.

The Synthesizer/IF/Processor 14 generates the necessary frequencies for the MMW pulsed radar of the present invention and creates an IF signal for the transmitter section. This section 14 also down-converts a receiver intermediate frequency (IF) to baseband, digitizes the received signal, and processes it. The output of the processor 44 may be connected to a display or guidance system in any cases where this radar is used as a weapon sensor. To generate the required frequencies, the synthesizer 14 uses its main tunable voltage controller oscillator (VCO) 46, which allows the radar to vary any transmit and receive RF frequency, and the two fixed voltage controlled oscillators 40, 48 (or synthesizers) that generate the transmit IF signal and down convert the receiver IF signal to baseband. These synthesizers 40, 48 are usually phase locked using a phase locked loop circuit (PLL) and a common reference clock signal. The modulator 72 usually up-converts the desired signal to a transmit intermediate frequency (IF) of about 1 to 2 GHz. On the receive side, the demodulator 38 down-converts the receive intermediate frequency (IF) signal to a baseband, in-phase, quadrature (I/Q) signal, which is digitized using the analog/digital converter circuit 42 and processed at the digital processor 44.

Figure 2:
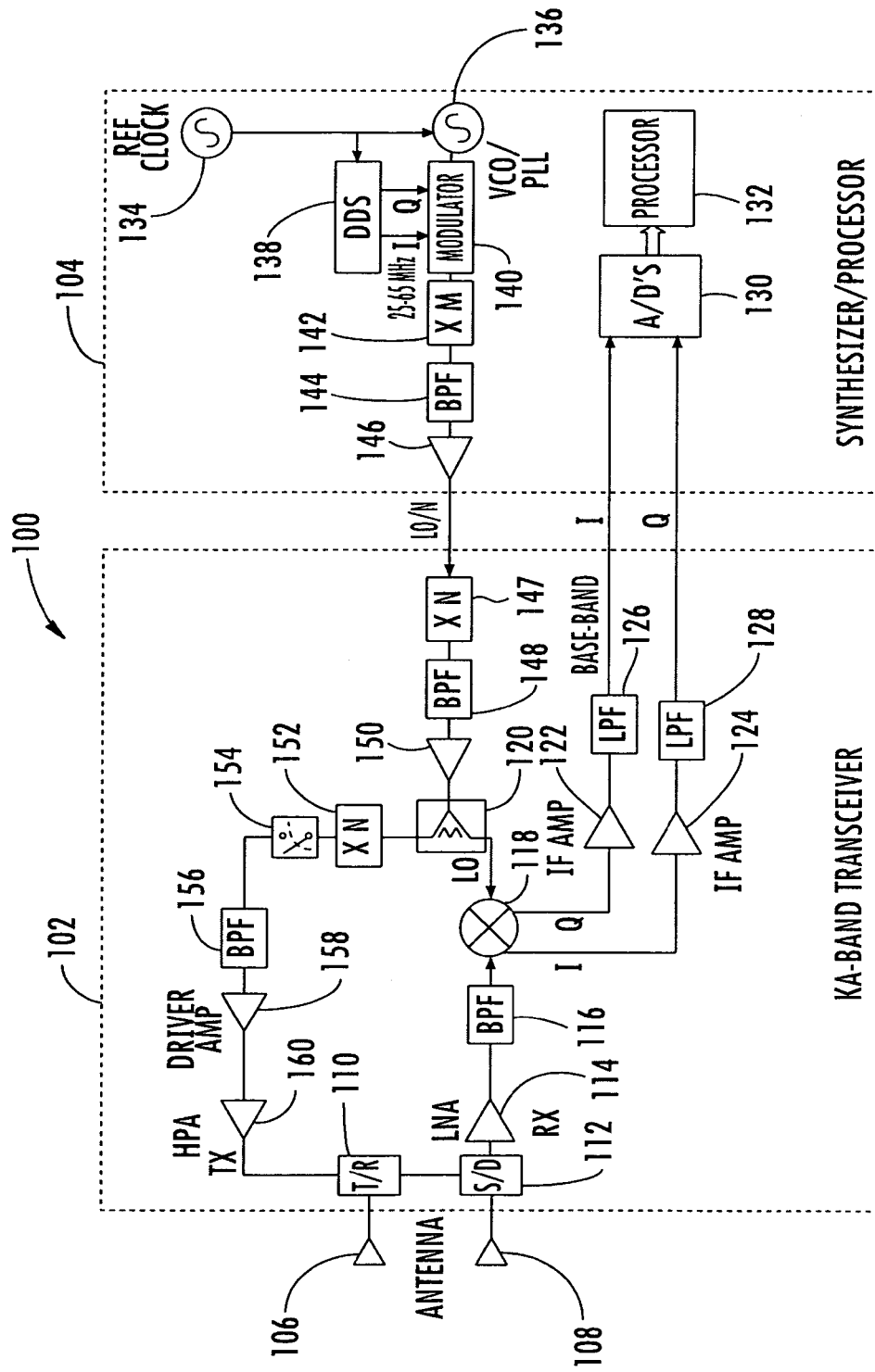
FIG. 2 is a block circuit diagram of a millimeter wave (MMW) pulsed radar system in accordance with the present invention.

FIG. 2 is a block circuit diagram of an example of a millimeter wave pulsed radar system 100 of the present invention, which includes a Ka-Band transceiver 102 and a synthesizer/processor section 104 operatively connected to each other. An antenna section includes a sum antenna port 106 and difference antenna port 108. The sum antenna port 106 is connected into a transmit/receive switch 110, which is operative with a sum/difference switch 112. The sum/difference antenna port 108 is connected to the sum/difference switch 112. At a receiver section, received MMW radar signals are passed into a low noise amplifier (LNA) 114, a bandpass filter (BPF) 116 and a mixer 118, operative as a sub-harmonic image reject mixer, which receives a local oscillator signal from a Wilkinson Power Divider 120. From the mixer 118, in-phase (I) and quadrature (Q) intermediate frequency (IF) signals are passed into respective intermediate frequency amplifiers 122, 124 and into respective low pass filters 126, 128. The in-phase and quadrature signals are passed into an analog/digital (A/D) converter circuit 130 and into a processor 132, for example, a microprocessor, microcontroller or other processor unit, as part of the synthesizer/processor 104. In this section, a reference clock 134 transmits clock signals to a voltage controlled oscillator/phase locked loop and oscillator circuit 136 and a Direct Digital Synthesizer (DDS) circuit 138, which is operative to generate in-phase (I) and quadrature (Q) signals into a quadrature modulator 140 at 25–65 MHz. Signals from the quadrature modulator 140 are passed into a frequency multiplier circuit 142, and into a bandpass filter 144 and an amplifier 146. Signals are passed from the synthesizer/processor 104 as a local oscillator (LO/N) signals (also operative as intermediate frequency (IF) signals) back to the transceiver 102 and received within a frequency multiplier circuit 147, a bandpass filter 148 and amplifier 150. This local oscillator signal is divided by the Wilkinson Power Divider 120 into signals for the sub-harmonic image reject mixer 118 and a frequency multiplier circuit 152. At the transmitter section, the signal is passed to a switch 154, a bandpass filter 156, driver amplifier 158 and high power amplifier (HPA) 160, and into transmit/receive switch 110.

The radar system 100 of the present invention advantageously eliminates the transmit and receive IF frequencies, eliminates two synthesizers, i.e., the transmit and receive IF synthesizers, and simplifies overall system design. The use of a Direct Digital Synthesizer (DDS) chip 138, such as AD9854 chip manufactured by Analog Devices, allows for greater waveform generation flexibility and eliminates many functions previously required in prior art MMW pulsed radar systems, for example, the type such as shown in FIG. 1.

The AD9854 chip is an example of CMOS 300 MSPS quadrature DDS, which permits quadrature local oscillator frequency synthesis with programmable clock generators, including an FM chip for radar and scanning systems. This chip can include two internal high speed, high performance quadrature D/A converters and digitally programmable I and Q synthesizer function. It can generate highly stable, frequency-phase amplitude-programmable sine and cosine outputs and can be used as an agile local oscillator. It can include 14-bit phase registers and phase shift keying functions with an input/output interface to permit phase changes. Twelve-bit I and Q digital-to-analog (D/A) converters with the DDS architecture provide wideband and narrow-band output SFDR.

The chip includes a 300 MHz internal clock rate with FSK, BPSK, BSK, chip and AM operation. It can use dual integrated 12-bit D/A converters and an ultra high speed comparator. It has excellent dynamic performance and a 4× to 20× programmable reference clock multiplier, dual 48-bit programmable frequency registers, dual 14-bit programmable phase offset registers, and 12-bit amplitude modulation and programmable shape-on/off keying. It can use a single-pin FSK and BPSK data interface and PSK capability using the I/O interface and can have linear or non-linear FM chirp functions and a single-pin frequency hold function and a frequency-ramped FSK. This type of chip can use bi-directional frequency sweeping and different correction and simplified control interfaces. It includes multiple power-down functions and a single-ended or differential input reference clock. It also uses a small, 80-lead LQFP packaging.

In this radar system, a VCO/PLL chip 136, such as the ADF 4360 chip made by Analog devices, outputs a fixed frequency signal, which is then modulated, using an I/Q modulator 140 such as the AD8346 made by Analog Devices, with a signal generated by the DDS chip 138, such as the AD9854 chip described before, to form the transmitter IF and the LO/N signal for the receiver.

The ADF4360 chip can be a fully integrated integer-N synthesizer and voltage-controlled oscillator (VCO) with a center designed frequency that could range about 2000 MHz. It could include a divide-by-2 option and prescaler and programmable output power level. It could include a power-down load.

The AD8346 chip can be a quadrature modulator with a 1 degree RMS quadrature error at 1.9 GHz and 0.2 dB I/Q amplitude balance. It has a broad frequency range and side band suppression and is operative as a silicon RFIC I/Q modulator. Any differential local oscillator input can be applied to a poly-phased network phased splitter that provides accurate phase quadrature. A buffer amplifier can improve the signal-to-noise (SIN) ratio. It can use Gilbert-cell mixers that are driven by the local oscillator (LO) inputs and differential V-to-I converters that can be connected to baseband inputs and provide a baseband modulation of signals for mixers. This modulator can be used as a transmit modulator in digital system, including PCS, DCS, GSM, CDMA and ISM transceivers, as non-limiting examples. Various QPSK and QAM formats can be produced at the RF output. The chip is useful with direct digital synthesizers and a hybrid phased-lock loop to generate signals over a wide frequency range with millihertz resolution. It is usually supplied in a 16-lead TSSOP package.

Referring again to the description of FIG. 2, in operation, the modulated carrier signal (IF/LO signal) is multiplied up to about 8 to 15 GHz in the synthesizer 104 and further multiplied up in the Transceiver 102 to millimeter wave. The bandwidth that the direct digital synthesizer 138 covers is also multiplied when the local oscillator is multiplied. For example, if the DDS bandwidth is 40 MHz, and the VCO is at 2 GHz, if the LO is multiplied by 16 to ka-band, the swept bandwidth is also multiplied to 640 MHz (40×16).

The transceiver 102 includes a transmitter section. In operation, the transmitter pulse is gated using the switch 154. During the transmit cycle, both the driver amplifier 158 and the high power amplifier 160 are turned on. During the receive cycle, the driver amplifier 158 and the high power amplifier 160 are turned OFF by pinching-off the gate voltages. Because the receiver uses a sub-harmonic image reject mixer 118, the final local oscillator multiplication will be performed in the mixer, operative as an image reject mixer. Therefore its outputs are I and Q baseband signals that require no additional down conversion.

This type of direct down conversion from millimeter wave to baseband is implemented in one non-limiting example by a millimeter wave direct conversion mixer, for example, a direct conversion mixer of the type manufactured by United Monolithic Semiconductors (UMS). Although the I/Q mixer 118 provides some image rejection capability (typically about 15 dB) additional image rejection (up to 60 dB) can be achieved by using a digital correction in the processor 132 on the digitized I and Q data. The correction factor can be calculated during radar calibration by injecting a signal at the low noise amplifier 114 input and measuring the I and Q gain and phase imbalance. The correction term is updated periodically over temperature.

In operation, the MMW pulsed radar system 100 of the invention can take advantage of pulse compression. Linear frequency modulation (LFM) is one of the oldest and best developed of pulse compression techniques. The Linear FM (or chirp) waveform has a rectangular transmit pulse of duration T. The carrier frequency f is swept linearly over the pulse length by an amount $\Delta F$ (Bandwidth). The pulse compression ratio is given by $T \times \Delta F$. For example, for a 25 microsecond pulse and a bandwidth of 10 MHz, the pulse compression ratio is 250.

In this design, high time-bandwidth products are achieved through the transmission of a LFM waveform, while implementing the compression in the receiver via an active correlation process. Active correlation multiplies returns by a replica of the transmitted waveform, filters to extract the unmodulated waveform envelope, and integrates the resulting difference frequency product across the pulse width to complete the matched filter operation. In this design, the receiver output is mixed with a LFM signal, whose slope and time extent match the transmitted waveform. As a result, active correlation multiplication is conducted at radio frequency followed by a low pass filtering to extract the difference-frequency terms.

Afterward, the signal is split into I and Q components within the mixer 118 and digitized for further processing. Pulse compression is completed by performing a spectral analysis of the difference frequency output to transform the pulsed tones into corresponding frequency resolution cells.

In this system, this is achieved by performing a Fast Fourier Transform (FFT) on the digitized difference frequency. Active correlation reduces computational throughput requirements as compared with other digital compression techniques by performing multiplication in the receiver.

During the transmit cycle, the DDS modulates the voltage controlled oscillator (VCO) 136 output with the desired waveform. For example, if a linear FM waveform is used, the DDS 138 will chirp the frequency by an amount equal to the desired output bandwidth/frequency multiplication number ($\Delta F/16$).

Figure 3:
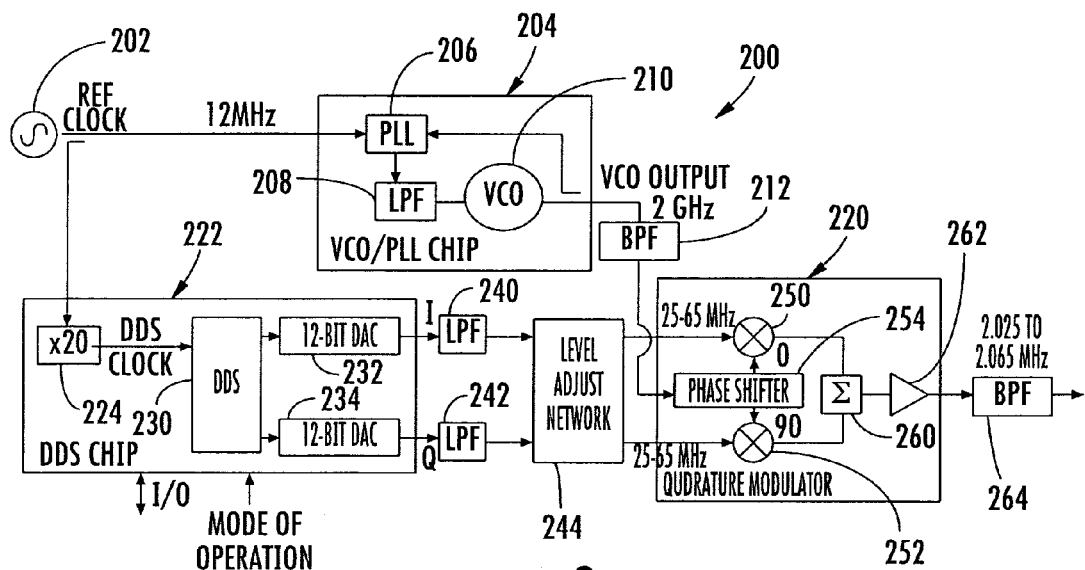
FIG. 3 is a block circuit diagram of one example of a radar synthesizer that can be used with the MMW pulsed radar system of the present invention.

FIG. 3 is a block circuit diagram of an example of a radar frequency synthesizer 200 that can be used for the MMW pulsed radar system 100 such as shown in FIG. 2, in accordance with the present invention, and operative to provide a circuit with high flexibility. As indicated, a reference clock 202 generates clock signals for a voltage controlled oscillator/phase locked loop (VCO/PLL) circuit 204 formed in this example as a single chip, which includes a phase locked loop circuit 206 and low pass filter 208 that passes signals into the voltage controlled oscillator 210, feeding back into the phase locked loop circuit 206. The chip 204 could be an ADF4360 chip as described above. A voltage controlled oscillator signal is output at around 2 GHz and passed into a bandpass filter 212 and into the quadrature modulator 220. An example of such a quadrature modulator chip is an AD4386 chip as described before. At the reference clock 202, a clock signal is generated into the DDS chip 222, such as the AD9854 chip described before, which includes a multiplier circuit 224. From this circuit 224 the signal is passed as a DDS clock signal into a DDS circuit 230, operative through an input/output interface.

Also, mode of operation signals are received. The output from the DDS circuit 230 is passed to I/Q, D/A converters 232, 234 and output as 12-bit digital-to-analog converted signals as an in-phase (I) and quadrature (Q) output. These signals are received in respective I/Q low pass filters 240, 242 and into a level adjust network 244. The I/Q signals are received into respective I/Q mixers 250, 252 at 25–65 MHz operation as part of the quadrature modulator 220. The mixers 250, 252 are operative with a phase shifter circuit 254, which has received the bandpass filter signal from bandpass filter 212. The outputs from the mixers are summed in summer 260 and amplified by amplifier 262 and passed into a bandpass filter 264 at about 2.025 to about 2.065 MHz, in accordance with one example of the present invention.

The radar system of the present invention phase locks the fixed frequency VCO/PLL chip 204 to the reference clock 202, and the DDS chip 222, which is also phase locked to the same reference clock 202 and level adjust network 244 for balancing the I and Q signals, the quadrature modulator 220 and filters. The VCO output is filtered at the bandpass filter 212 to remove any harmonics, spurious signals and the reference clock signal. The VCO frequency is selected to be about 2 GHz in one non-limiting example.

The DDS chip 222, such as the AD9854 described before, generates stable frequency-phase-amplitude-programmable sine and cosine outputs that are used to modulate a fixed frequency VCO output. This circuit architecture allows generation of simultaneous quadrature output signals at frequencies up to 150 MHz, which can be digitally tuned at a rate of about 100 million new frequencies per second. The DDS chip 222 supports many radar waveforms including frequency shift keying (FSK), binary phase shift keying (BPSK), phase shift keying (PSK) and chirped FM. It provides two 14-bit phase registers and a single pin for BPSK operation. Two 12-bit digital multipliers permit programmable amplitude modulation, phased On/OFF keying and precise amplitude control of the quadrature output. The use of the dual integrated digital-to-analog converters of this chip with a specified 0.01 dB gain imbalance (digitally controlled) and 0.2 deg phase imbalance, assures minimum error contribution (over temperature) from the DDS portion of the synthesizer, and results in an image level below −53 dBc. The DDS outputs are filtered using the low pass filters 240, 242.

The Level Adjust Network (LAN) 244 can be formed from resistors that are used to adjust the DDS chip 222 output to the desired modulator input level. With the use of precision, thin film resistors in the level adjust network to set the bias precisely, the system can prevent the introduction of offset errors, which will increase local oscillator leakage. For example, selecting resistor networks with 0.1% ratio matching characteristics will maintain 0.03 dB gain and offset matching performance. Typically, the ratio matching characteristics of the resistive network, as opposed to its absolute accuracy, are more critical in preventing the gain and offset balance between the I and Q signal path. By applying small dc offsets to the I and Q signals from the digital-to-analog converters, the local oscillator leakage can be reduced from −42 dBm to as low as −60 dBm while holding to approximately −50 dBm over temperature. If lower levels of LO and Image are desired, then digital potentiometers can be used to precisely match the I and Q levels, which are typically adjusted during calibration. They can be updated periodically versus temperature using the processor, e.g., a microcontroller or other processor, which drives digital potentiometers.

Figure 4:
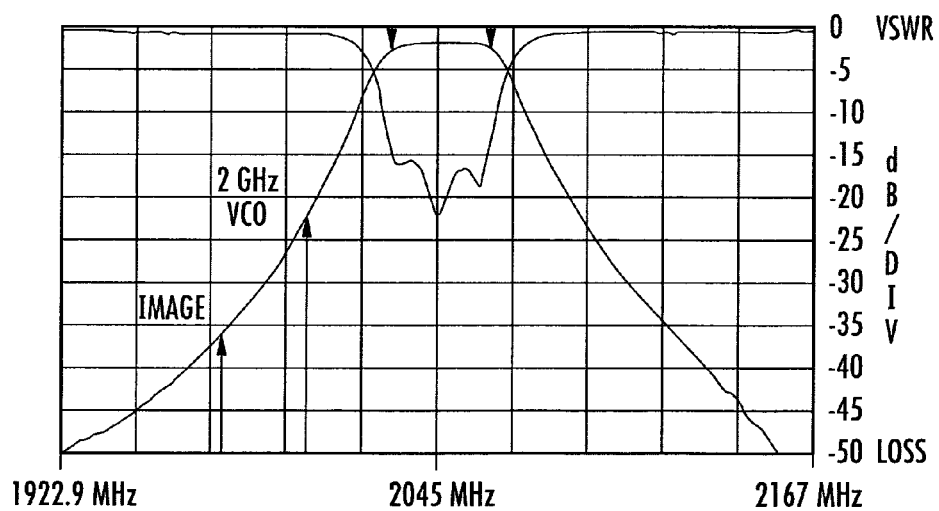
FIG. 4 is a graph showing a local oscillator filter response for filtering the output of a modulator such as shown in FIG. 2 in accordance with the present invention.

The I/Q quadrature modulator, such as the AD8346 chip described before, can be used from 0.8 Ghz to 2.5 GHz. The LO input is applied to a phase splitter that provides accurate phase quadrature. The I/Q outputs of the phase splitter drive the local oscillator inputs of the two mixers 250, 252 as shown in FIG. 3. The outputs of the two mixers 250, 252 are summed together and amplified by receptive circuits 260, 262. The modulation bandwidth of this device is from DC to 70 MHz. The output of the modulator 220 is filtered, such as by a ceramic filter with similar characteristics to those shown in the graph of FIG. 4. This type of filter can be a 3-pole filter that provides an additional 20 dB LO leakage rejection, and well over 30 dB of image rejection.

One feature of a pulsed radar system is its ability to turn the transmitter pulses ON and OFF very rapidly. During the radar receive cycle, the transmitter is typically turned OFF so that it will not interfere with the low level received signal. In some applications, the radar pulses can be very narrow, for example, on the order of tens of nanoseconds. The transmitter pulse rise and fall times must be extremely short (<15 nsec). In the present invention, it is possible to switch the transmit amplifier ON and OFF for the desired pulse by using the amplifier gate biasing to turn the high power amplifier circuits ON and OFF. The gate bias is set using digital-to-analog converters, which are controlled by the processor or microcontroller.

Figure 5:
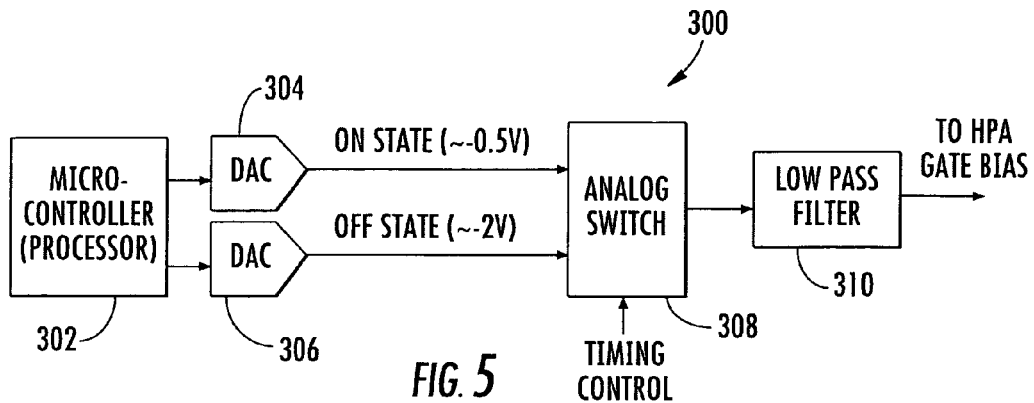
FIG. 5 is a block circuit diagram of a gate driver using a two state analog circuit and high speed switching that can be used with the MMW pulsed radar system of the present invention.

One example for the gate driver circuit 300 that can be used in the present invention is shown in FIG. 5. This circuit 300 uses a two state analog circuit with high speed switching circuit. As illustrated, a microcontroller (processor) 302 that could be that as described before provides signals to digital/analog converters 304, 306 for an ON state and OFF state, and into an analog switch 308 that receives a timing control signal. Signals from the analog switch 308 pass into a low pass filter 310 and are output as a gate driver signal to the high power amplifier as the gate bias signal.

Two levels can define "OFF" and "ON" conditions of the high powered RF amplifiers used in the present invention. In operation, the high powered RF amplifier switches between these two states as fast as possible given the space, component availability, manufacturability and cost requirements. The levels of the two states are driven by a digital-to-analog converter integrated circuit (DAC). The output of the DAC is filtered through a low pass filter network to avoid any current spikes on the DAC itself. These outputs are then fed into a high speed, low resistance, analog switch with two inputs and one output. The analog switch is controlled by an external digital control line. This control line is directly controlled by the host system outside of the unit, with no internal logic, other than logic buffers. The output of the analog switch is filtered to allow driving of the capacitive load present at the gate of the RF high powered amplifier. This capacitive load generates the current spikes in the switching circuit, hence the requirement for the filter network.

There are many radar applications that require high efficiency due to size restrictions or weight and thermal constraints caused by the limited cooling surface and the inability to use active cooling. One of the advantages of the present invention is its ability to control the transmitter efficiency by controlling the gate bias at the high power amplifier.

Figure 6:
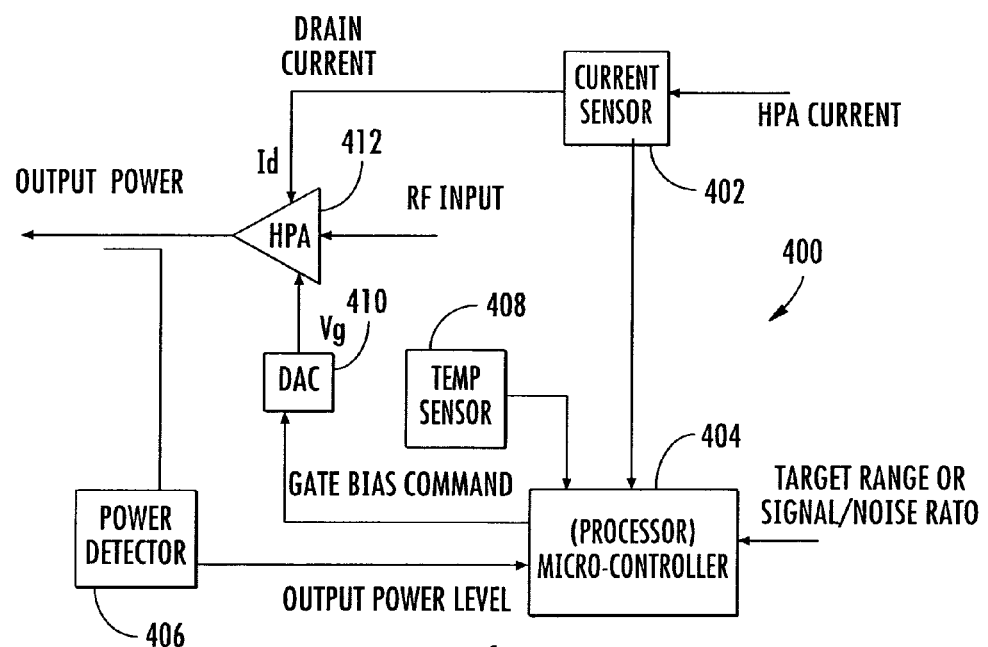
FIG. 6 is a block circuit diagram of a power efficiency control circuit that monitors drain current, transmitter output power, sensor temperature and target range or signal/noise ratio that can be used with the MMW pulsed radar system the present invention.

An example of power efficiency control circuits 400 operative with the MMW pulsed radar system of the present invention are shown in FIG. 6. A HPA drain current signal is received into a current sensor circuit 402 and a target range or signal/noise ratio signal is received into the microcontroller 404, which receives an output power level signal from a power detector circuit 406. The microcontroller 404 can be the same or similar processor as described before relative to other drawing figures. The gate bias command is generated from the microcontroller 404 into the digital/analog converter circuit 410 and into the high power amplifier 412, which receives the RF input and transmits output power, which is also detected by the power detector 406. The current sensor circuit 402 passes drain current into the high power amplifier 412. The microcontroller 404 receives a temperature sensor signal from the temperature sensor circuit 408, and receives the HPA drain current value sensed by current sensor 402, also the target range or signal-to-noise ratio, and a measured output power level signal from the power detector circuit 406. The optimum gate bias is calculated by the microcontroller 404 and sent to the digital-to-analog converter 410, which generates the gate voltage for the high power amplifier 412.

The microcontroller 404 automatically sets the bias voltage for the high power amplifier by monitoring the drain current, the transmit output power, the sensor temperature and the target range (or Signal/Noise ratio). An example of a circuit having a microcontroller, which can be adapted for use in the present invention, is disclosed in commonly assigned U.S. patent application Ser. No. 09/863,052 filed May 22, 2001, and entitled "Self-Tuned Millimeter Wave RF Transceiver Module." That type of system includes a low cost surface mount controller. The module performance can be optimized in real time with no intervention, for use in communications and radar systems as well as fiber optics and other radio frequency and optical fiber applications.

This module includes a microwave monolithic integrated circuit (MMIC) chip, having at least one amplifier and a controller operatively connected to the MMIC for sensing amplifier operating conditions and tuning the at least one amplifier to an optimum operating condition. The controller can include a surface mounted microcontroller chip operatively connected to the MMIC. The controller could include a memory having stored values of optimum operating conditions for the at least one amplifier, such that when the controller tunes the at least one amplifier based on the stored values of optimum operating conditions. The memory can be a EEPROM. The stored values of optimum operating conditions can include preset MMIC characteristics, including optimum drain current and expected amplifier output at various stages in a radio frequency circuit. The controller can include a sensor for sensing the changes in operating amplifier conditions by the at least one amplifier. The controller can adjust the at least one amplifier based on sensed changes and amplifier operating conditions.

A digital potentiometer can be connected to the amplifier for stepping gate voltage based on sensed changes and amplifier operating conditions. A multi-channel, analog-to-digital converter can be operatively connected to the sensor and digitized the sensor output to be compared with stored values at optimum operating conditions. The temperature sensor can measure the temperature of the MMIC. The controller can be responsive to sensed temperature for determining whether any change in amplifier operating conditions is a result of a changed temperature or malfunction. A power sensor diode can be operatively connected to the amplifier and the controller can be responsive to the power sensing diode for tuning the amplifier. The controller can correct one of at least one gain variation over temperature, linearization of the power monitor circuit as a function of temperature and frequency, gain equalization as a function of frequency, and power attenuation linearization as a function of frequency and temperature.

In operation, when the radar is initially turned on the gate bias is set for a nominal output power. As the temperature rises, the gate bias is adjusted to increase the amplifier efficiency. Efficiency is the ratio of the output RF power to the dissipated DC power. In many applications, such as a missile seeker sensor, the transmitter power required to detect a target decreases as the missile flies towards the target and the distance decreases. The power requirement decrease is proportional to $1/R^4$. As the distance to the target decreases by ½, the power requirements decrease by a factor of 1/16. In this application, the power can be reduced as a function of range to the target and therefore, the transmitter efficiency can be increased to reduce the amount of heat generated from dissipated power.

Figure 7:
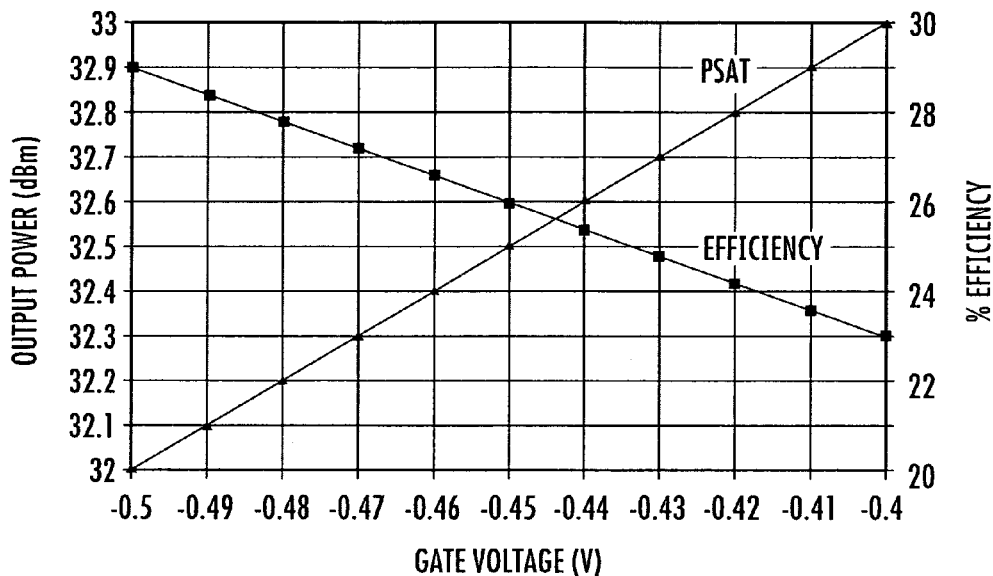
FIG. 7 is a graph showing transmitted output power as a function of gate bias voltage for a MMW high power amplifier used in the MMW pulsed radar system of the present invention.

FIG. 7 is a graph showing an example of high power amplifier efficiency and transmitted output power as a function of gate bias voltage in an example of a MMW amplifier application for a MMW pulsed radar system of the present invention. By reducing the gate bias from −0.4 to −0.5, the output power drops by 1 dB, while the efficiency increases from 23% to 29%.

Figure 8:
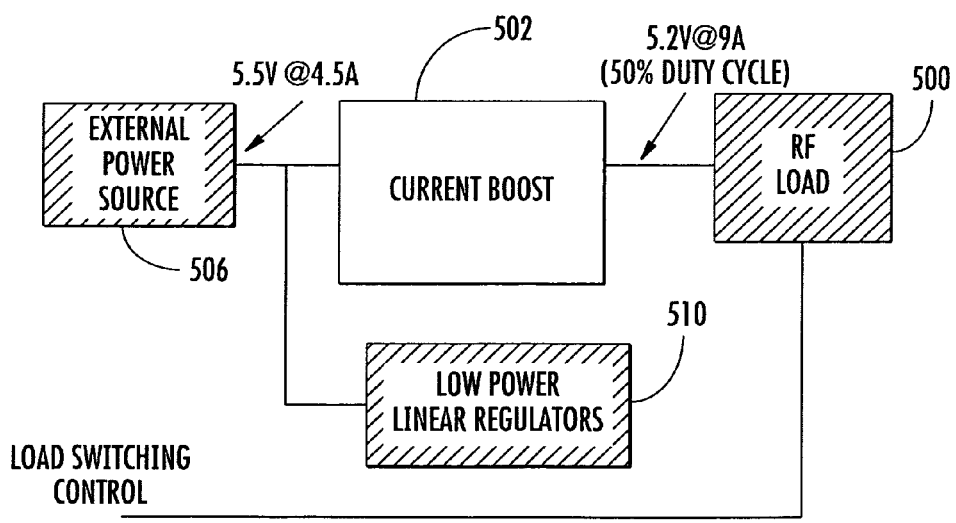
FIG. 8 is a block circuit diagram showing examples of power supply requirements and loads for various circuits used in the MMW pulsed radar system of the present invention.

The radar sensor RF and electronic circuit require several voltages for its operation. In particular the RF circuit will require a single +5.2 volts supply at approximately 9 A with a 50% duty cycle from a single external source of +5.5V at approximately 4.5 A as shown in FIG. 8. As illustrated, a load switching control signal is received into the RF load 500, which is operative with the current boost circuit 502 and the external power source 506. Low power linear regulators 510 are operative with the external power source 506 and current boost circuit 502. The external power source can be about 5.5 volts at 4.5 amps, as one non-limiting example, and the RF load operative with the current boost is about 5.2 volts at 9 amps with a 50% duty cycle, as one non-limiting example.

In this non-limiting example, all voltages for the RF and other electronic circuits will be generated within the radar from this power supply source. The power for the electronic circuits which is a very small percentage of the overall power will be provided through several low power linear regulators. The power for the RF circuit can be delivered by a Current Boost circuit, such that it can supply a current of approximately twice the magnitude as the current available at the source.

Conventional power sources or converters such as switching power supplies or DC/DC converters are not viable candidates due to their oscillator noise, power dissipation and size, which is caused by their insufficient efficiencies for this specific application. Furthermore, these types of designs are unable to respond rapidly to switching current demand with a rise and fall time of 15 ns.

Figure 9:
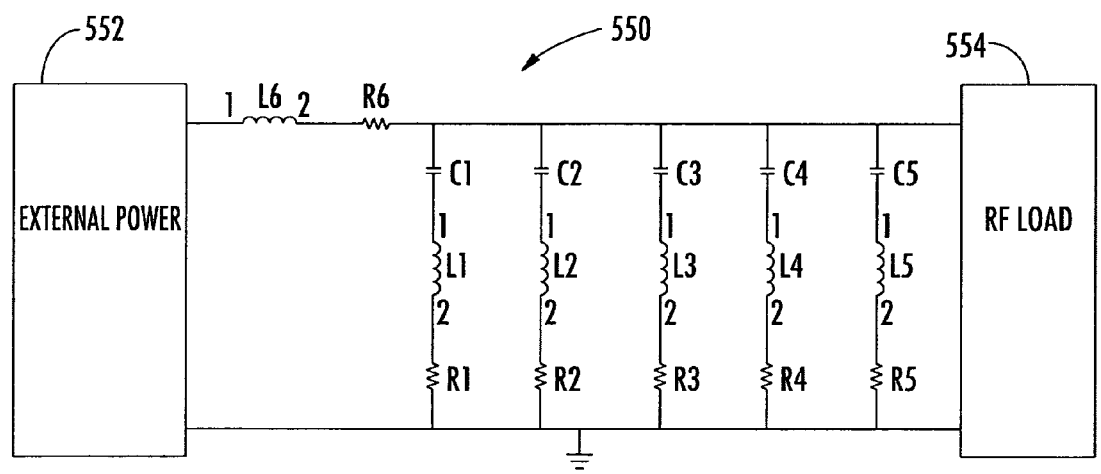
FIG. 9 is a block circuit diagram of an example of a current boost circuit that can be used in the MMW pulsed radar system of the present invention.

One example of a current boost circuit 550 for the present invention including a bank of ultra low equivalent series resistor (ESR) capacitors, and inductor as shown in FIG. 9. As illustrated, an external power source 552 is connected into the RF load 554 via two parallel circuit lines. One circuit line connecting the power source 552 and RF load 554 includes an inductor L6 and resistor R6. Parallel capacitors C1 through C5 are serially connected to parallel inductors L1 through L5 and serially connected to resistors R1 through R5. The capacitors are used as a primary storage of the energy that can deliver the required current to the load. A bank of capacitors is used rather than a single large capacity capacitor (i.e., super capacitor) with a very high storage capacity to further reduce the ESR of the overall capacitors. The component selection, implementation, optimization and grounding scheme are essential to minimize size and performance while ensuring that switching high current load along with very fast rise and fall times do not introduce spikes and noise to the circuit.

The circuit takes advantage of the lower than 100% duty cycle of the RF load current demand. A series of capacitors are used to store energy during the "off" time and deliver this energy to the load during the "on" time, when the RF load is activated. The capacitors are rapidly charged up through input inductance and resistance during the "off" time and are partially discharged to the RF load during the "on" time. L1 through L5 and R1 through R5 are the internal inductances and resistances of the capacitor bank. To maintain minimal noise and ripple at the output voltage, R1 through R5 must be kept as low as possible. For this reason distributed capacitors are used instead of a single large or super capacitor. The distributed capacitors lower the effect of series resistance by paralleling R1 through R5, as well as allowing better use of board real estate where space for larger components may not be available. The inductance L6 is added to minimize the fluctuation of current at the input, hence to further increase the system efficiency.

Figure 10:
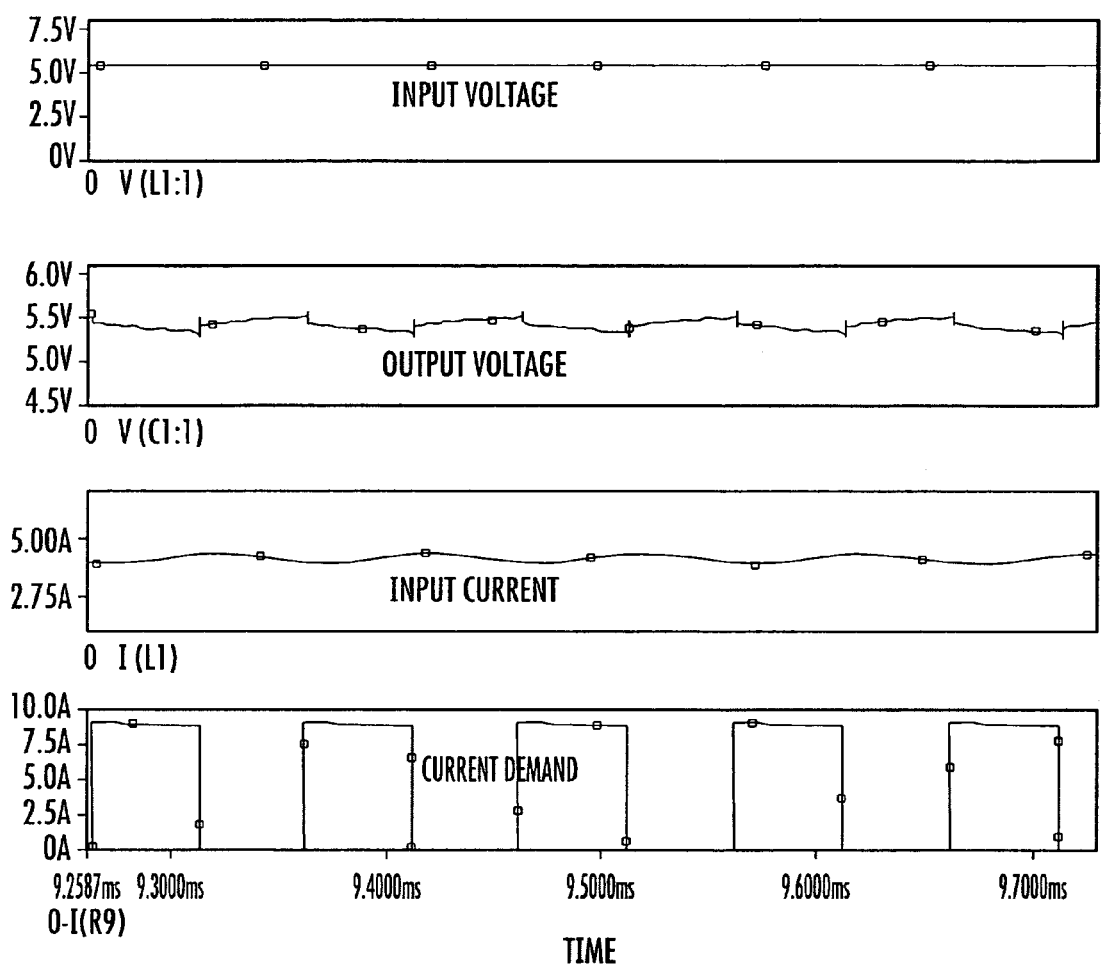
FIG. 10 is a graph showing simulated booster output voltage and current used in a MMW pulsed radar system of the present invention.

FIG. 10 is a graph showing the simulated current booster output voltage and current. This graph also shows that the output voltage has minimal ripple, and the input current variation is also very low.

There are several novel features of the current boost circuit as described. This circuit responds to current demand of very fast rise or fall time and boosts current for applications where the duty cycle of the current draw is less than 100%. The circuit also boosts current with better than 94% efficiency. No power component is required. This system also has minimal component count and heat dissipation. There is no external switching noise or oscillator and the output of the current boost will be used directly to power the RF section. No further down regulation is required.

The MMW pulsed radar system of the present invention also provides an improved MMW package. Traditionally, prior art MMW packaging used a gold-plated, high-cost, CTE-matched carrier for mounting any RF circuit, which includes ceramic substrates, GaAs MMIC devices, and other SMT electronic components. Examples of carrier materials used in prior art MMW packages included copper-tungsten, copper-moly, AlSiC, and kovar. These carriers were then generally fastened into larger housings, which contained the rest of the controlling circuit, which might be fabricated from more common materials, such as FR4. Both electrical and structural interconnects usually were made between these two sections of the circuit.

The packaging for the MMW pulsed radar of the present invention removes the requirement for (a) a CTE-matched carrier, (b) a complicated mounting system, and (c) a complex interconnect between the various sections of the circuit.

Figure 11:
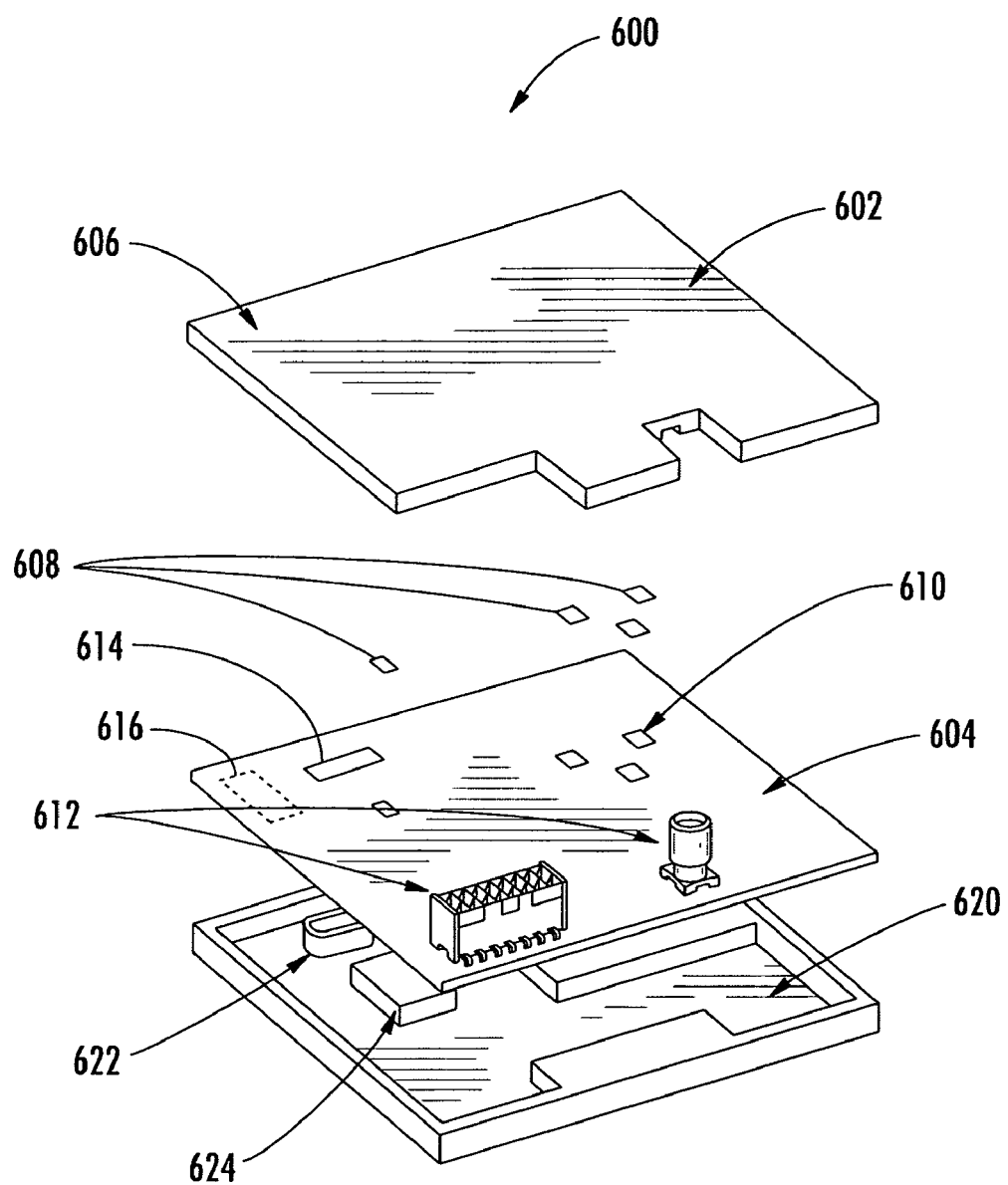
FIG. 11 is an exploded isometric view of an example of a transceiver in the MMW pulsed radar system in accordance with the present invention.

FIG. 11 is an exploded view of a transceiver module 600 such as used for the MMW pulsed radar system of the present invention. As illustrated in the exploded isometric view of this transceiver module, a channelized substrate cover 602 can be bonded to an RF substrate, such as a circuit card assembly 604, and the assembled unit can be sealed using a conformal coating 606 or similar process. The various MMIC chips 608 are illustrated and the circuit card assembly contains RF, power and control circuitry, and includes various cut-outs 610 for mounting the MMICS. RF, power and control connector 612 can be integral to the substrate, e.g., circuit card assembly 604. SMT components 614 are mounted on at least one side and other SMT components 616 can be mounted on the bottom side. The base 620 provides a mounting structure and clearance for additional SMT components and contains waveguide ports 622 for an RF signal interface. Waveguide ports can alternatively exit the cover 602 or sides of the transceiver. A thermal path 624 is formed below the MMIC's 608 as well as other heat generating components.

In one aspect of the present invention, the channelized substrate cover 602 can be made from standard FR4 material (or similarly functional material) and plated to provide the shielding necessary for RF circuitry. FR4 laminate can include plated through-hole and multilayer printed circuit board construction. The "FR" typically corresponds to flame retardant and type "4" indicates the woven glass reinforced epoxy resin. It usually is formed from a glass fabric that is impregnated with epoxy resin, commonly referred to as "prepreg" and a copper foil that is typically about a half-ounce or about 18 microns or one ounce, typically about 35 microns in some non-limiting examples. The foil can be applied by electrodeposition with a surface electrochemically roughing to promote adhesion. For example, a 1.6 millimeter rigid laminate can be formed by bonding eight plies of heavyweight prepreg with a half-ounce of copper foil on either side. The dielectric constant can be about 4.4 to about 5.2 depending on the glass-resin ratio but can vary. The expansion coefficient can vary as well as the glass transition temperature.

This cover 602 is preferably bonded to the circuit card assembly 604 using electrically conductive epoxy or standard soldering processes. The circuit card assembly 604 uses preferably standard, multilayer FR4 (or similar material) for the digital, power, and control circuitry. A top layer material is an RF-specific material (i.e. Rogers) and is suitable for higher frequencies (Ka-band is one example). Such materials could include PTFE/ceramic or glass materials. Cut-outs 610 and thermal paths are provided for MMIC mounting and are discussed relative to FIGS. 13 and 14 below. I/O interconnects 612 are provided on the circuit card assembly using standard digital, power, and/or coaxial connectors.

The base 620 is preferably formed from aluminum, but other materials can be used in special circumstances. The base 620 forms a housing for the transceiver. This base also provides a mounting structure for the module, waveguide interfaces for high frequency RF signals, thermal paths 624 for MMIC's and other heat-generating devices, and provides clearance for additional SMT devices that are positioned on the circuit card assembly 604. Once assembled, the entire transceiver can be sealed using a conformal coat 606 or a similar process. In certain cases, this can take the place of a more expensive hermetic package.

Figure 12:
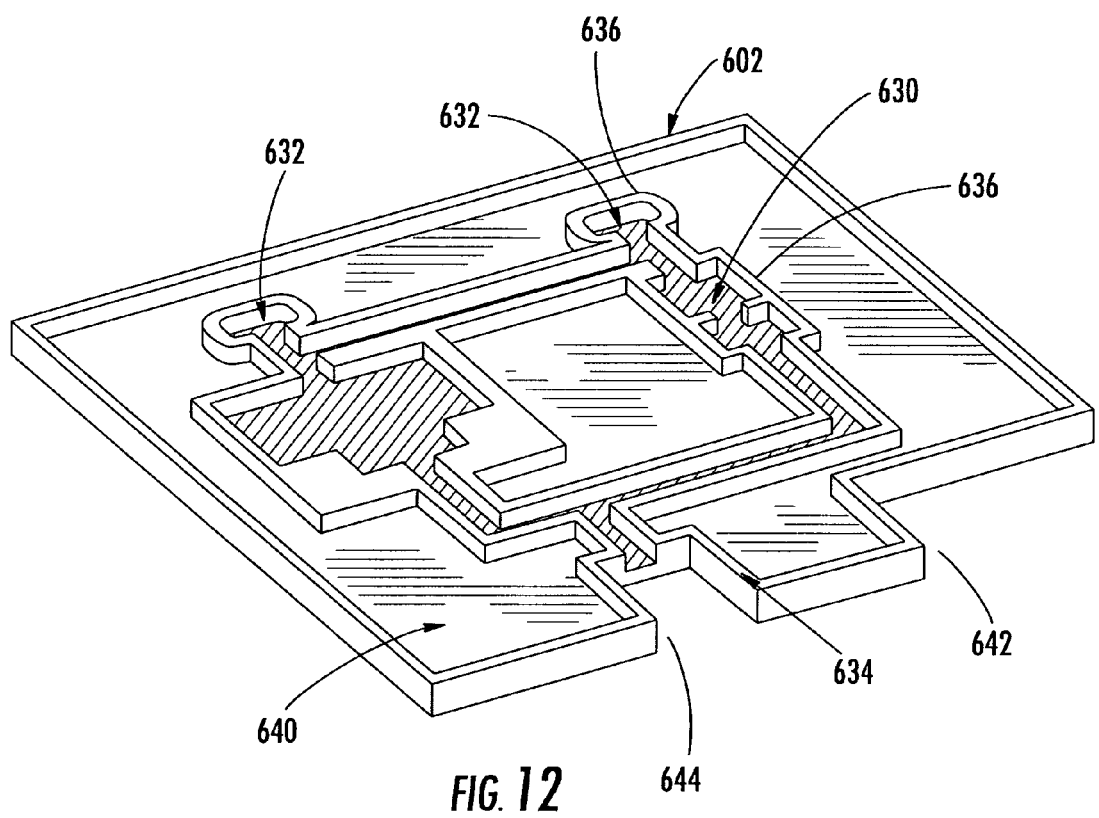
FIG. 12 is an isometric view of an example of the channelized substrate cover shown in FIG. 11 in its reversed configuration compared to its configuration in FIG. 11.

FIG. 12 shows the channelized substrate cover 602 in a flipped configuration as compared to the orientation of FIG. 11 to show the RF channels 630 (forming RF channelization) and waveguide transition back-short 632. The RF channelization 630 is shown cross-hatched to aid in visualization. As illustrated, the outer edge 634 of the cover is formed as a side wall, and other internal walls 636 form the waveguide transition back-short 632 and the RF channelization 630. The open area 640 between the edge 634 and internal walls 636 is available to contain other SMT devices positioned on the circuit card 604, such as a controller and power supply and other SMT devices. The outer edge 634 is metallized and adapted to be bonded to the circuit card 604 and provide any necessary channelization for RF circuitry. The outer edge 634 is configured to form a DC connector clearance area 642 for various DC connectors. Another RF connector area 644 is formed adjacent to it.

The RF channelization 630 has been cross-hatched to aid visualization. The channelization is sized according to frequency and component requirements to provide the necessary shielding for good RF design and performance. The cover 602 is preferably made of standard FR4 (or similar) substrate material, which has been plated and described before. This plating provides RF shielding once it is bonded using epoxy or solder to any RF ground planes on the circuit card 604. Because the cover 602 is made of the same material as the circuit card 604, thermally induced stresses are reduced or eliminated (as compared to soldering an aluminum or steel cover into place) between the bonded cover 602 and circuit card. Any cavities in the cover provide clearance for other SMT and through-hole devices on the circuit card 604.

Figure 13:
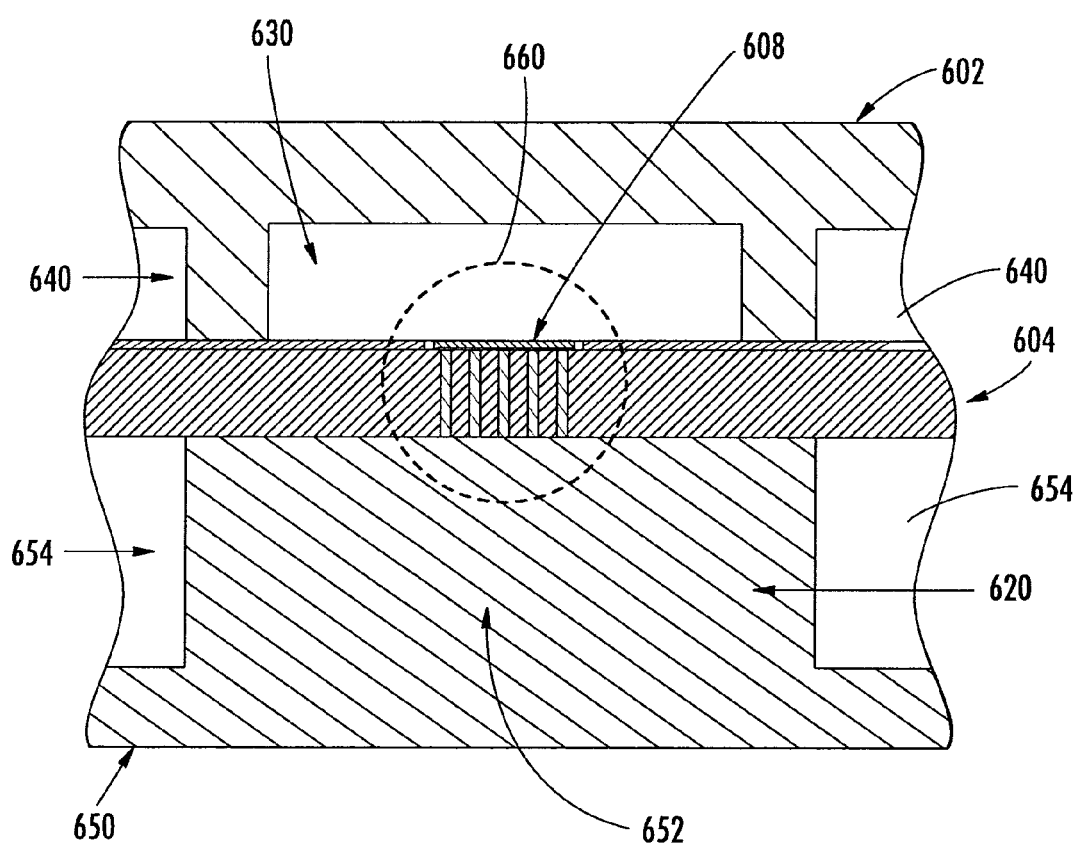
FIG. 13 is a sectional view of the assembled transceiver module shown in FIG. 11.

FIG. 13 is a cross sectional view of the transceiver module 600. As illustrated, the base 620 includes a base mounting surface 650 and a pedestal 652 forms a heat path below the MMIC chips 608 and other heat generating devices. An SMT component cavity 654 can be formed in the base, allowing space for various SMT components mounted on the underside of the circuit card 604. The circuit card 604 is shown attached to the base 620 and the channelized substrate cover and is bonded to the circuit card.

The RF channelization 630 is shown above the MMIC mounting area 660 (indicated by the dashed circle) and the other SMT component cavities 640 can be seen on either side of the MMIC mounting area. This bonded subassembly, i.e., the circuit card 604 and cover 602 is mounted to the base 620 such as by screws or similar fasteners. The pedestal 652 formed in the base is positioned below MMIC's, and other significant thermal generating devices, to transmit heat to the base mounting surface 650. The base also includes the cavities 654, which provide room for other circuit card SMT devices. Waveguide transitions can exit through the base for high-frequency RF signal interface, in this example. These waveguide transitions can also exit the cover or sides of the transceiver package.

Figure 14:
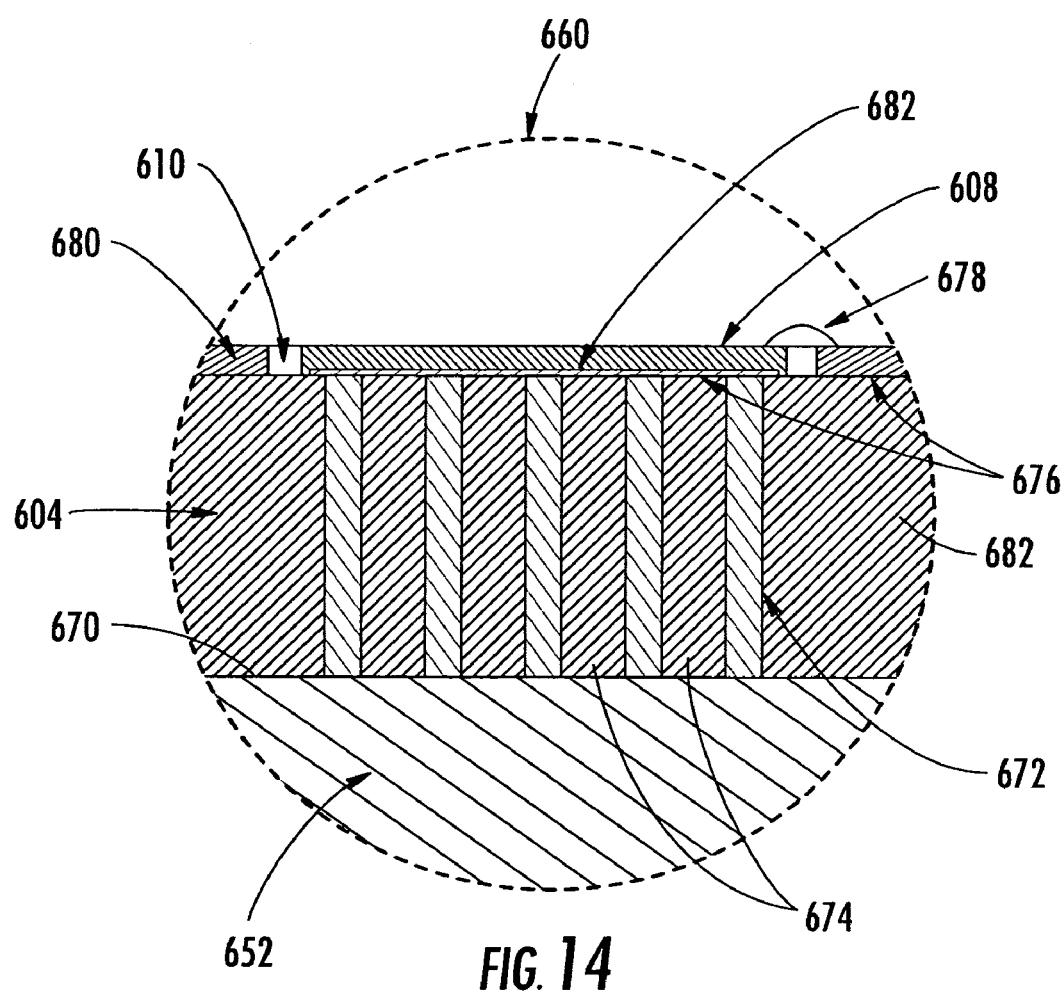
FIG. 14 is an enlarged sectional view of the circled area in FIG. 13, showing mounting details of the MMIC chip.

FIG. 14 is an enlarged view of the MMIC mounting area 660. As illustrated, the base 620 includes the pedestal 652 forming a thermal path through the base to a mounting surface 670. Other areas in the base provide clearance for SMT devices as described before. The circuit card 604 is formed to include a thermal and ground path 672, such as vias 674, although full copper plugs are optional. A continuous copper ground plane and heat spreader 676 is shown with a typical RF bond 678 located between the MMIC 608 and high frequency RF layer 680 formed from the Rogers material or similar material and positioned on the substrate 604, for example, FR4 material. The MMIC chip can be secured by thermal or electrical conductive epoxy 682. The pocket cut-out 610 through the RF layer to the thermal path is illustrated. The circuit card includes the high frequency RF-layer 680, such as formed from Rogers material or Rogers board, and forms the top layer of the multilayer circuit card. The pocket cut-out 610 is slightly larger than a MMIC. This cut-out 610 exposes a copper layer 676 below, which acts as a ground plane and heat spreader. The MMIC 608 is mounted directly onto this copper plane 676 using an electrically/thermally conductive epoxy. Any RF and DC interconnects are then made using standard wire-bonding techniques. The lower section of the multilayer substrate contains either thermal vias or a thermal plug, based on the power dissipated by the MMIC. Thermal vias 674 are shown in FIG. 14. A thermal plug could also be used and would be a solid section of copper directly below the MMIC).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A millimeter wave pulsed radar system comprising:
a radar synthesizer comprising a voltage controlled oscillator/phase locked loop (VCO/PLL) circuit that outputs a fixed frequency signal, a direct digital synthesizer (DDS) circuit that generates in-phase and quadrature signals (I/Q signals), and a quadrature modulator circuit that receives the fixed frequency signal and I/Q signals and generates a signal operative as an intermediate frequency and local oscillator signal (IF/LO signal); and
a radar transceiver operative with the radar synthesizer for receiving the IF/LO signal, and comprising a transmitter section having a frequency multiplier that multiplies the IF/LO signal up to a millimeter wave (MMW) radar signal, and a receiver section that receives a MMW radar signal, including a direct conversion mixer that receives the MMW radar signal and the IF/LO signal to produce I/Q baseband signals that are later digitized and processed.

2. A millimeter wave pulsed radar system according to claim 1, and further comprising a reference clock, wherein said VCO/PLL circuit and DDS circuit are phase locked to said reference clock.

3. A millimeter wave pulsed radar system according to claim 1, wherein said radar synthesizer comprises a frequency multiplier that receives the IF/LO signal and multiplies the IF/LO signal up to about 8 to about 15 Gigahertz.

4. A millimeter wave pulsed radar system according to claim 1, wherein said radar transceiver is operative for transmitting and receiving Ka-band signals.

5. A millimeter wave pulsed radar system according to claim 1, and further comprising an analog-to-digital (A/D) converter that receives the I/Q baseband signals to produce digitized I/Q data, and a processor for receiving said digitized I/Q data and providing image rejection.

6. A millimeter wave pulsed radar system according to claim 5, wherein said processor is operative for implementing a digital correction by injecting a signal at an amplifier input and measuring I/Q gain and phase balance to produce a correction term that is updated over temperature.

7. A millimeter wave pulsed radar system according to claim 1, wherein said transmitter section comprises a driver amplifier and high power amplifier that are operative during transmitter operation and inoperative during receiver operation.

8. A millimeter wave pulsed radar system according to claim 1, wherein said radar transceiver comprises a power divider operative with said transmitter and receiver sections for receiving and dividing the IF/LO signal into respective transmitter and receiver sections.

9. A millimeter wave pulsed radar system according to claim 1, wherein said radar transceiver further comprises a sum and difference antenna port and a transmit/receive switch and a sum/difference circuit operative with said transmitter and receiver section.

10. A millimeter wave pulsed radar system according to claim 1, wherein said transmitter section further comprises a high power amplifier (HPA), and a gate driver and two-state analog switch circuit operative for pulsing the HPA and producing a pulsed MMW radar signal.

11. A millimeter wave pulsed radar system according to claim 1, and further comprising a current boost circuit for supplying power to said radar transceiver, including an array of series connected capacitors, resistors and inductors.

12. A millimeter wave pulsed radar system according to claim 1, wherein said direct conversion mixer comprises a sub-harmonic image reject mixer.

13. A millimeter wave pulsed radar system according to claim 1, wherein said radar synthesizer is operative for pulse compression, including phase modulation and linear frequency modulation.

14. A millimeter wave pulsed radar system comprising:
a circuit card assembly having microwave monolithic integrated circuit (MMIC) chips and RF, power and control circuit components mounted thereon that form a radar synthesizer comprising a voltage controlled oscillator/phase locked loop (VCO/PLL) circuit, a direct digital synthesizer (DDS) circuit, and a quadrature modulator circuit that are operative with each other for generating an intermediate frequency and local oscillator signal (IF/LO signal), and a radar transceiver operative with the radar synthesizer for receiving the IF/LO signal, and comprising a transmitter section that multiples the IF/LO signal up to a millimeter wave (MMW) radar signal for transmission, and a receiver section that receives and mixes a MMW radar signal and the IF/LO signal and down converts the MMW radar signal to I/Q baseband signals that are later digitized and processed;
a base on which the circuit card assembly is positioned, including waveguide ports and a thermal path formed therein and positioned below any MMIC chips and circuit components that produce excess heat during operation; and
a substrate cover made of the same material as the circuit card assembly secured on the circuit card assembly and including metallization and RF channelization.

15. A millimeter wave pulsed radar system according to claim 14, wherein said substrate cover and circuit card assembly are both formed from FR4 material.

16. A millimeter wave pulsed radar system according to claim 14, wherein said circuit card assembly includes a top layer formed as a RF specific material.

17. A millimeter wave pulsed radar system according to claim 16, wherein said RF specific material comprises Rogers material.

18. A millimeter wave pulsed radar system according to claim 14, wherein said circuit card assembly includes a ground plane and heat spreader mounted under said MMIC chips.

19. A millimeter wave pulsed radar system according to claim 18, wherein said circuit card assembly includes vias interconnecting said base and ground plane and heat spreader.

20. A millimeter wave pulsed radar system according to claim 14, and further comprising a reference clock, wherein said VCO/PLL circuit and DDS circuit are phase locked to said reference clock.

21. A millimeter wave pulsed radar system according to claim 14, wherein said radar synthesizer comprises a frequency multiplier that receives the IF/Lo signal and multiplies the signal up to about 8 to about 15 Gigahertz.

22. A millimeter wave pulsed radar system according to claim 14, wherein said radar transceiver is operative for transmitting and receiving Ka-band signals.

23. A millimeter wave pulsed radar system according to claim 14, and further comprising an analog-to-digital (A/D) converter that receives the I/Q baseband signals to produce digitized I/Q data and a processor for receiving said digitized I/Q data and providing image rejection.

24. A millimeter wave pulsed radar system according to claim 23, wherein said processor is operative for implementing a digital correction by injecting a signal at an amplifier input and measuring I/Q gain and phase balance to produce a correction term that is updated over temperature.

25. A millimeter wave pulsed radar system according to claim 14, wherein said transmitter section comprises a driver amplifier and high power amplifier that are operative during transmitter operation and inoperative during receiver operation.

26. A millimeter wave pulsed radar system according to claim 14, wherein said radar transceiver comprises a power divider operative with said transmitter and receiver sections for receiving and dividing the IF/LO signal into respective transmitter and receiver sections.

27. A millimeter wave pulsed radar system according to claim 14, wherein said radar transceiver further comprises a sum and difference antenna port and a transmit/receive switch and a sum/difference circuit operative with said transmitter and receiver sections.

28. A millimeter wave pulsed radar system according to claim 14, wherein said transmitter section further comprises a high power amplifier (HPA), and a gate driver and two state analog switch circuit operative for pulsing the HPA and producing a pulsed MMW radar signal.

29. A millimeter wave pulsed radar system according to claim 14, and further comprising a current boost circuit for supplying power to said radar transceiver, including an array of series connected capacitors, resistors and inductors.

30. A millimeter wave pulse radar system according to claim 14, wherein said radar synthesizer is operative for pulse compression, including phase modulation and linear frequency modulation.

* * * * *